Dec. 13, 1938.    H. J. E. REID ET AL    2,139,694
AIR-SPEED ACCELERATION RECORDER
Filed April 14, 1932    3 Sheets-Sheet 1
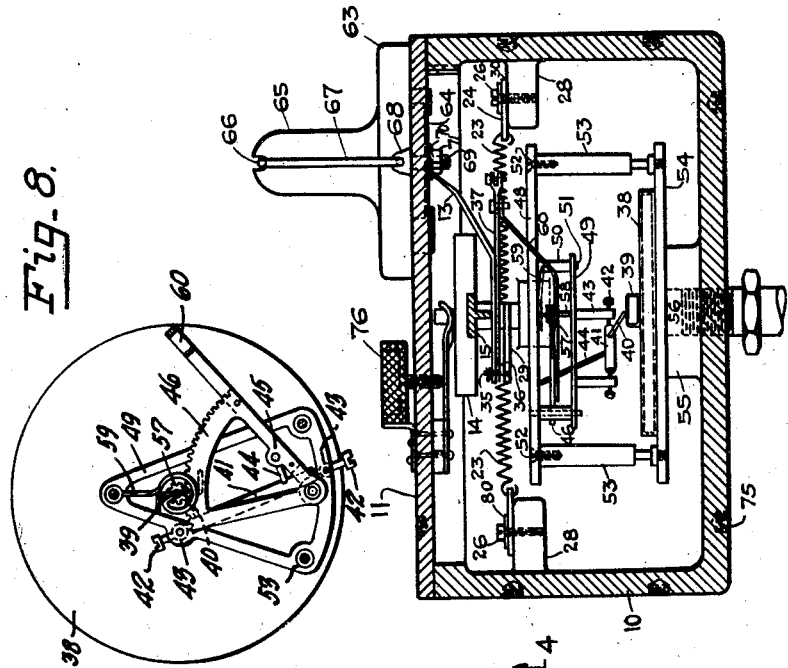
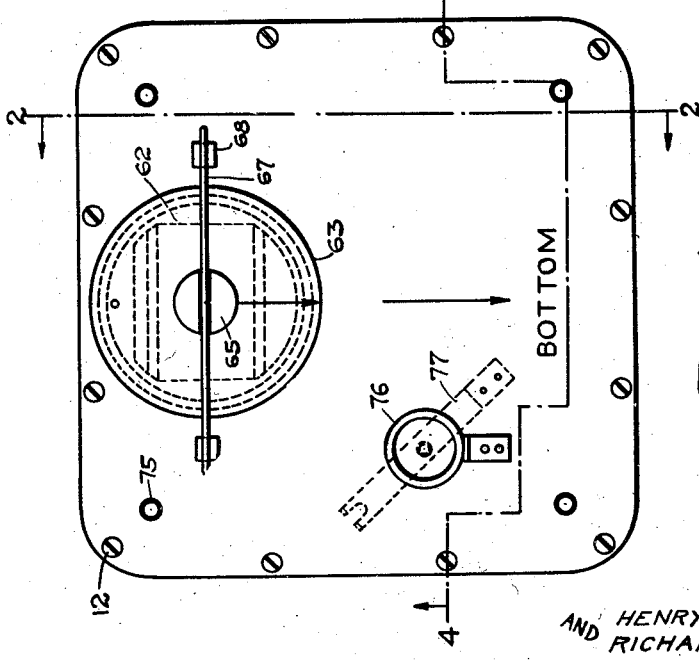
HENRY J. E. REID
AND RICHARD V. RHODE
INVENTORS
BY
Robert A. Lavender
ATTORNEY

HENRY J. E. REID
AND RICHARD V. RHODE
INVENTORS

BY
ATTORNEY

Dec. 13, 1938.  H. J. E. REID ET AL  2,139,694
AIR-SPEED ACCELERATION RECORDER
Filed April 14, 1932   3 Sheets-Sheet 3

HENRY J. E. REID
AND RICHARD V. RHODE
INVENTORS

BY
Robert A. Lavender
ATTORNEY

Patented Dec. 13, 1938

2,139,694

UNITED STATES PATENT OFFICE 2,139,694

AIR-SPEED ACCELERATION RECORDER

Henry J. E. Reid and Richard V. Rhode, Hampton, Va.

Application April 14, 1932, Serial No. 605,324

11 Claims. (Cl. 234—29)

(Granted under the act of March 3, 1883, as amended April 30, 1928; 370 O. G. 757)

Our invention relates broadly to an air-speed acceleration recorder and more particularly to a device for use in an aircraft to indicate acceleration with respect to dynamic pressure.

The primary object of our invention is to provide an aircraft with an instrument to enable the study of the critical loading imposed on the aircraft in actual service i. e. during a period when the aircraft is in flight.

Another object of our invention is to provide an aircraft with an instrument to record the relative severity with which different pilots maneuver their aircraft and thereby obtain a comparative check upon the fitness of pilots for different classes of flying.

A further object of our invention is to provide an instrument to record the magnitudes of acceleration obtained in transport aircraft with a view of determining which pilots or aircraft, or both, are likely to cause the least irregular acceleration, and hence, ultimately, to provide the smoothest possible service.

Still another object of our invention resides in providing an instrument to determine the corresponding value of acceleration or load factor and lift coefficient encountered in flight of an aircraft.

A further object of our invention is in providing an aircraft with an instrument for the purpose of studying the effect of weather conditions and terrain on general flying in different sections of the country especially as to the effects of loads imposed on the aircraft.

With the above and other objects in view the invention consists in the construction, combination and arrangement of parts as will be described more fully hereinafter.

Reference is to be had to the accompanying drawings forming a part of this specification, in which like reference characters indicate corresponding parts throughout the several views, and in which:

Figure 1 is a plan view of our instrument.

Figure 2 is a view on line 2—2 of Figures 1 and 3.

Fig. 8 is a view on line 8—8 of Fig. 4.

Figure 3:
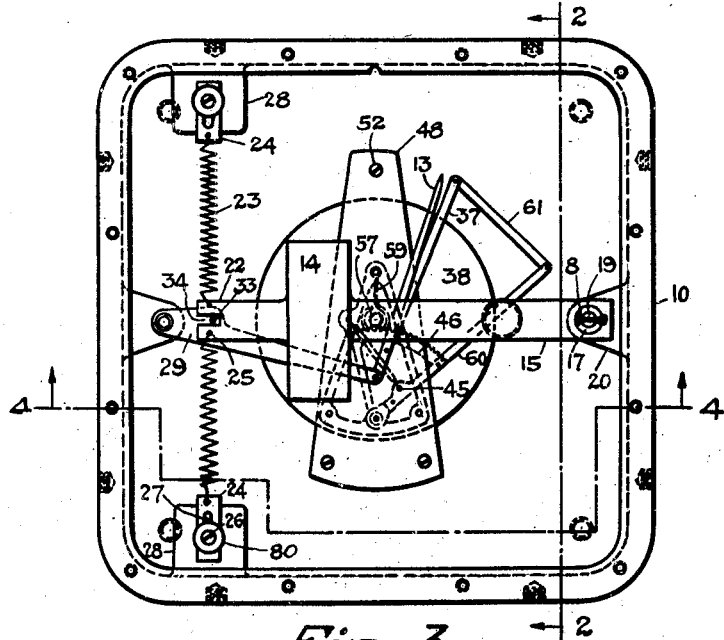
Figure 3 is a plan view of our instrument with the cover removed.

Referring more particularly to the drawings, 10 indicates a casing having a cover 11 secured thereto by screws 12. The casing with cover attached is air tight and has suitably mounted therein an accelerometer unit and a dynamic pressure unit, both of which are connected to a stylus or pen 13 for recording their movements on a chart.

The accelerometer unit consists of a weight 14 affixed to a lever 15 that has a hub end 16 pivoted for rotation to a post 19 secured in a lug 20 integral with casing 10. The lever 15, which is offset as at 21 with a forked end 22, is constrained by springs 23 that have one end secured to clips 24 and the other end looped through apertures 25 in the forked end 22. The clips 24 are adjustably secured by means of washers 80 on screws 26 that are placed through slots 27 in the clips and extend into lugs 28 of the casing.

Figure 4:
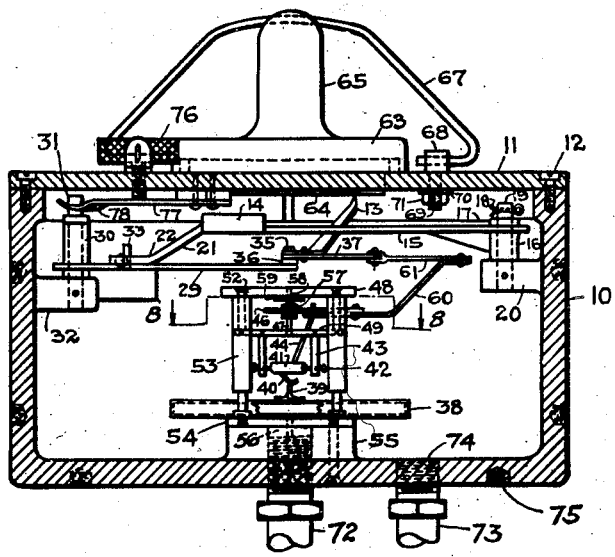
Figure 4 is a view on line 4—4 of Figures 1 and 3.

A lever 29 is pivoted by hub 30 on a post 31 secured in lug 32 on the opposite side of the casing from lug 20. The lever 29 (Figs. 3 and 4) is provided with pin 33 that extends through a slot 34 of the forked end 22 of lever 15. Movement of the lever 15 therefore, is transmitted to lever 29 which is rotatably fixed by screw 35 and washer 36 to stylus arm 37 with stylus 13 secured thereto.

The dynamic pressure unit comprises a suitable flexible pressure cell or diaphragm 38 having a bearing bracket 39 in the center thereof for operating through a lever arm 40 of a bell crank a multiplying mechanism which is also connected by linkage to stylus arm 37. The bell crank in addition to arm 40 consists of a shaft 41 rotatably pivoted by screws 42 between two posts 43 and a lever arm 44 extending up from shaft 41. The lever 44 passes through an aperture in lug 45 in one side of a sector gear 46 that is secured for rotation to a shaft 47 positioned between an upper plate 48 and a lower plate 49 attached by means of posts 50 and pins 51 to plate 48. The upper plate 48 is mounted by screws 52 to posts 53 which are threaded into plate 54 supported on collar 55 of a passage 56 to the diaphragm 38. Meshing with gear 46 is a pinion gear 57 mounted on shaft 58 positioned between plates 48 and 49. A coil hair spring 59 which has one end fixed to shaft 58 and the other end to one of the posts 50 retains the multiplying mechanism in a neutral position through the pinion 57 and sector gear 46. An arm 60 riveted to and extending out from gear 46 is rotatably secured to a link 61 that in turn is connected with stylus arm 37. Thus, movement of diaphragm 38 will be transmitted through bracket 39 to lever arm 40 so as to rotate shaft 41 which rotation in turn moves by lever arm 44 the sector gear 46 and this movement of the sector gear 46 is then transmitted through arm 60 and link 61 to the stylus arm 37 which in turn moves stylus 13.

Cut into cover 11 is a suitable opening 62 into which is inserted and held in place by a cap 63, a smoked glass 64 on which movements of the stylus 13 can be recorded. It will be noted that the accelerometer and pressure units are so constructed that respective movements thereof will cause stylus 13 to move across the glass 64 in directions substantially transverse to each other.

The cap 63 has an extending head 65 into which is cut a groove 66 to receive a ball 67 adapted to hold the cap firmly in place. The ball 67 is fastened to cover 11 by eye bolts 68 having threaded shanks 69 extending through and secured on the underside of cover 11 by washers 70 and nuts 71.

The casing 10 is provided with passage 56 into which is threaded a pressure tube 72 for supplying the full impact of air into the diaphragm 38. To transmit to the casing 10 the static pressure of air, a static tube 73 is threaded into aperture 74 in the casing. For securing the instrument to a panel board, threaded holes 75 adapted to receive bolts are suitably drilled into various parts of the casing.

Movement of stylus 13 by the accelerometer unit is regulated by damping means consisting of a knurled screw 76 threaded through an aperture in the cover and having its end bear against a friction plate 77 that has one end riveted to the underside of the cover and the other end forked as at 78 so as to fit around post 31 and set up the desired friction on the hub end 30 of lever 29. This friction may be adjusted to any desired value by screw 76 and in the practical use of the instrument is set so that no movement of stylus 13 is obtained when the engines are idling or the craft is in steady flight.

The instrument is so designed that, in practical use, it may be installed in an aircraft for any period of time. The readings will show, as desired, either the maximum and minimum accelerations at all air speeds at which the aircraft has been operated during a period of service or the relations between acceleration and air speed for a single maneuver.

Our improved instrument may be used in such a manner that it will record the component of acceleration in any direction. When mounted so that this direction is perpendicular to the wing chord, the acceleration recorded in terms of $g$ is a direct measure of applied load factor. The lift coefficient corresponding to any acceleration is obtained through the use of the following formula:

$$\frac{a}{g}=n=\frac{F_N}{W}=\frac{C_N \frac{1}{2} r V^2 S}{W}=\frac{C_N \frac{1}{2} r V^2}{\frac{W}{S}}$$

in which $a$ is acceleration, $g$ is the acceleration of gravity, $n$ is the load factor, $F_N$ is the component of force on the aircraft normal to wing chord, $W$ is the weight of the aircraft, $C_N$ is the normal force coefficient, $r$ is the density of the air, $V$ is the velocity and $S$ is the wing area. $n$ can be determined directly from the record of the instrument, that is, from the recorded acceleration. $\frac{1}{2} r V^2$ is the dynamic pressure measured by the instrument. The weight $W$ and the wing area $S$ are known from the characteristics of the aircraft, which allows the determination of $C_N$, the normal force coefficient.

Figure 5:
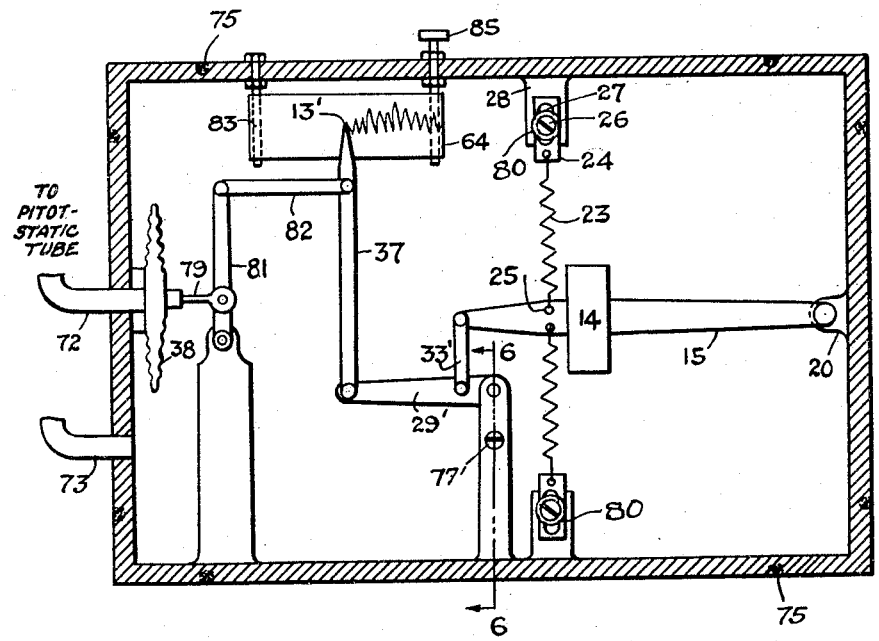
Figure 5 is a diagrammatical view of a form of our instrument.

For the purpose of describing the practical operation of our device, we have diagrammatically shown in Figure 5 a simplified form of our improved instrument wherein the diaphragm 38' is connected to the stylus arm 37' through arm 79, lever 81 and link 82 whereby the movement of the diaphragm will be transmitted to the stylus 13'. The impact pressures are conveyed to the diaphragm 38' by tube 72 which in turn is connected to a suitable entrapping device, such as the impact side of a Pitot-static tube, not shown. The impact pressures will cause the diaphragm to expand but, in order to only record the dynamic pressures, the static pressure from the static side of the entrapping device, the Pitot-static tube, is brought to the inside of casing 10 by tube 73. Thus, the expansion of the diaphragm through the resultant dynamic pressures causes the arm 79, lever 81, link 82 and stylus arm 37' to move stylus 13' in a substantially horizontal direction in Fig. 5 on the recording chart.

The chart 90 shown in this figure has one end mounted on a spindle 83 and the other end fixed to a shaft 84 that can be rotated on the outside of the casing 10 by turning the head 85. This chart 90 is of a flexible material, such as paper or any other material on which recording can be made, so that the same can be conveniently rolled from the spindle 83 onto the shaft 84. In this manner various maneuvers can be separately recorded.

Figure 6:
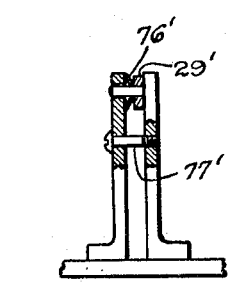
Figure 6 is a view on line 6—6 of Figure 5.
Figure 7:
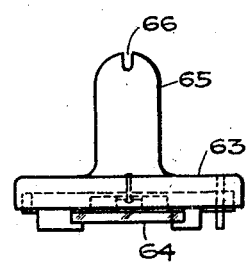
Figure 7 is a view of a detail of the cover plate or cap of our instrument.

When the aircraft is accelerated, weight 14 lags in the opposite direction to the sudden change of velocity and will eventually cause the lever arm 15 to move. This movement actuates through link 33' (which link serves the same purpose as pin 33 and slot 34 of Figs. 3 and 4) and lever 29', stylus arm 37' causing the stylus 13' to move in the substantially vertical direction and record on the chart the relative amounts of movements made by weight 14 and lever 15, thereby giving a record of the acceleration made by the aircraft. In order to set up a definite value for the amount of acceleration, the weight 14, link 33' and springs 23 can be adjusted to give the proper travel of the stylus 13' on the chart, and to prevent movement of the stylus when the engine or engines of the aircraft are idling while the aircraft is on the ground or when the aircraft is in steady flight, the proper amount of friction is put on lever 29' by adjusting friction plate 77' (Fig. 6) by screw 76'.

The herein described invention may be manufactured by or for the Government of the United States for governmental purposes without the payment to us of any royalties thereon or therefor.

What we claim is:

1. An instrument for an aircraft comprising a chart, a stylus and actuating means responsive to accelerations of the aircraft for moving said stylus in one direction substantially proportional to the applied acceleration, and means responsive to dynamic pressures for moving the said stylus in a second direction substantially at right angles to the first movement and substantially proportional to the dynamic pressure so that the stylus makes a record of the instantaneous values of applied accelerations of air speeds.

2. An instrument for an aircraft comprising a chart, means responsive to accelerations of the aircraft, means responsive to dynamic pressures opposing the aircraft and means connected with the acceleration responsive means and dynamic pressure responsive means for recording in one operation on said chart the relation of accelerations of the aircraft to the dynamic pressures opposing the aircraft.

3. The method of indicating during the flight of an airplane the approach and existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, simultaneously measuring the values of such variables, and indicating the relationship between the actual value of one of said variables so measured and the value of such variable which in conjunction with the measured value of the other variable will produce one of said predetermined combinations of the variables of acceleration and dynamic pressure.

4. The method of indicating during the flight of an airplane the existence of any flight condition characterized by a certain relationship between the variables of acceleration of the airplane in a direction substantially perpendicular to the lifting surfaces of the airplane and the dynamic pressure due to the velocity of the airplane through the air as expressed by a curve showing for any given value of one of said variables the value of the other variables which will produce in some structural member of the airplane a predetermined load for that member comprising, simultaneously measuring the values of both of such variables, and indicating the relationship between the actual value of one of said variables so measured and that value of the same variable which in conjunction with the measured value of the other variable will produce the predetermined load on such member.

5. The method of indicating during the flight of an airplane the approach and existence of any flight condition characterized by certain predetermined combinations of the variables of acceleration acting on the airplane in a direction substantially perpendicular to the lifting surfaces of the airplane and the dynamic pressure due to the velocity of the airplane through the air comprising, simultaneously measuring the values of such acceleration and dynamic pressure, and indicating the relationship between the actual acceleration so measured and the value of such acceleration which in conjunction with the measured value of the dynamic pressure will produce one of said predetermined combinations of acceleration and dynamic pressure.

6. An instrument for an aircraft comprising a chart and means for producing a record on said chart, said record producing means including means responsive to accelerations of the aircraft for actuating the record producing means in one direction substantially proportional to the applied acceleration and a second means responsive to dynamic pressure for actuating the record producing means in a direction substantially at right angles to the first direction so that a record of the instantaneous values of applied accelerations against dynamic pressures is made on the chart.

7. An instrument for an aircraft comprising a chart movably positioned in the instrument, and means for producing a record on said chart, said record producing means including acceleration responsive means and means responsive to dynamic pressure whereby a composite record of acceleration and variation in air speed is recorded on the chart.

8. An instrument for an aircraft comprising a chart, a stylus for recording on said chart, a dynamic pressure cell, means connecting said cell to the stylus for moving the stylus in certain directions over the chart, means responsive to changes in acceleration of the aircraft and means transmitting the movement of the acceleration responsive means to the stylus for moving the stylus over the chart in directions transverse to the movements caused by said pressure cell.

9. An instrument for an aircraft comprising a chart, a floating pivot structure mounted in the instrument, a stylus for recording on said chart and having an arm pivotally secured to said structure, and acceleration responsive means and dynamic pressure responsive means connected to said pivot structure so as to control the movement of the stylus to record instantaneous values of applied accelerations against dynamic pressures on the chart.

10. An instrument for an aircraft comprising a chart, and means for producing a composite record of acceleration and dynamic pressure on the chart, said means including acceleration responsive means, means responsive to dynamic pressure and a floating pivot structure connected to and controlled by said acceleration responsive means and dynamic pressure responsive means.

11. An instrument for an aircraft comprising a chart, and means for producing a composite record of acceleration and dynamic pressure on the chart, said means including a stylus having an arm extending therefrom, acceleration responsive means, means responsive to dynamic pressure, and a floating pivot structure connected to the stylus arm, acceleration responsive means and dynamic pressure responsive means whereby the movement of the stylus is controlled by the acceleration responsive means and the dynamic pressure means through the floating pivot structure.

HENRY J. E. REID.
RICHARD V. RHODE.